United States Patent [19]
Jorach et al.

[11] Patent Number: 5,383,647
[45] Date of Patent: Jan. 24, 1995

[54] GAS-INJECTION VALVE FOR INTERNAL COMBUSTION ENGINE

[75] Inventors: Rainer Jorach, Ostfildern; Klaus Binder, Deizisau, both of Germany; Shoichi Furuhama, Tokyo, Japan

[73] Assignee: Daimler-Benz AG, Stuttgart, Germany

[21] Appl. No.: 214,972

[22] Filed: Mar. 17, 1994

[51] Int. Cl.⁶ .................... F16K 31/143; F02B 43/00
[52] U.S. Cl. .................. 251/63.6; 123/527; 123/DIG. 12
[58] Field of Search ............ 251/63.6, 63.5; 123/DIG. 12, 527

[56] References Cited

U.S. PATENT DOCUMENTS

| | | | |
|---|---|---|---|
| 2,552,960 | 5/1951 | Greishaber et al. | 251/63.6 |
| 3,970,054 | 7/1976 | Henault et al. | 123/DIG. 12 |
| 4,307,654 | 12/1981 | de Almeida | 251/63.6 |
| 4,685,653 | 8/1987 | Kaltenthaler et al. | 251/63.6 |

FOREIGN PATENT DOCUMENTS

| | | | |
|---|---|---|---|
| 542630 | 8/1922 | France | 123/DIG. 12 |
| 2548278 | 1/1985 | France | 123/DIG. 12 |
| 2038097 | 2/1972 | Germany. | |
| 3541484 | 11/1987 | Germany. | |
| 4-318264 | 11/1992 | Japan | 123/DIG. 12 |

Primary Examiner—A. Michael Chambers
Attorney, Agent, or Firm—Klaus J. Bach

[57] ABSTRACT

A gas-injection valve for injecting gaseous fuel into the combustion chamber of an internal combustion engine, comprising a valve housing and, disposed therein, a longitudinally displaceable piston having connected thereto a poppet valve for controlling an injection port, which poppet valve opens in the direction of gas flow, said piston separating a gas space from an operating space adapted to be pressurized by having hydraulic control fluid fed thereto by a pressure pump, and the gas pressure within the gas space alone being sufficient to move the poppet valve to and to hold it in its closed position when the operating space is depressurized.

6 Claims, 2 Drawing Sheets

GAS-INJECTION VALVE FOR INTERNAL COMBUSTION ENGINE

BACKGROUND OF THE INVENTION

The invention relates to a gas-injection valve for injecting a gaseous fuel, particularly hydrogen, into the combustion chamber of an internal combustion engine.

Such a gas-injection valve is disclosed in German Offenlegungsschrift No. 3,541,484 as comprising a valve housing and, disposed therein, a piston which is guided so as to be longitudinally displaceable against a spring action and has connected thereto a needle valve by means pin. The piston separates a fuel-filled pressure-gas space from a pressure oil-filled operating space of the hydraulics control. The pressure-gas space is connected, through an exposed line and through bores in the valve housing, to a pressure space surrounding the pressure shoulder of the needle valve. The control-oil pressure and the gas pressure in the whole system are equal between injecting operations, and the closing spring acting upon the piston presses the needle valve against its valve seat. Thus, the closing force acting upon the needle valve is supplied solely by the closing spring.

As a pressure pump begins to operate, the pressure within the operating space of the control hydraulics rises, and the piston is displaced against the action of the closing spring while, at the same time, the gas pressure increases. As soon as the opening pressure of the needle valve is reached in the pressure-gas space, pressure gas flows through an orifice into the combustion chamber of the internal combustion engine.

German Offenlegungsschrift No. 2,038,097 likewise discloses, with particular reference to FIG. 3 and page 9 thereof, a gas-inject ion valve for injecting a gaseous fuel, one which comprises a valve housing and, disposed therein, a longitudinally displaceable piston and a valve element for controlling an injection port. With this design, the mixture flowing into the combustion chamber serves also as the pressure medium for operating the valve element which is designed as a poppet valve. However, there may also be provided an additional pressure medium for acting upon a piston on the valve element so as to assist in opening the valve. The valve is restored to its initial posit ion by spring action.

The present invent ion has for its principal object to provide a gas-injection valve of the type disclosed in German Offenlegungsschrift No. 2,038,097, but one which is simpler with respect to its valve-closing function and, furthermore, will allow smaller gas quantities to be injected.

SUMMARY OF THE INVENTION

The invention accordingly provides an improved gas-injection valve for injecting gaseous fuel into the combustion chamber of an internal combustion engine, which gas-injection valve comprises a valve housing, and disposed therein, a longitudinally displaceable piston having connected thereto a poppet valve for controlling an injection port and which poppet valve is adapted to open in the direction of gas flow, said piston separating a gas space from an operating or hydraulic control space adapted to be pressurized by having hydraulic control fluid fed thereto by a pressure pump, the arrangement being such that the gas pressure within the gas space alone is sufficient to move the poppet valve to and to hold it in its closed position when said operating space is depressurized. In other words, with the operating or hydraulic control space depressurized, the poppet valve is movable to and retainable in its closed position solely by the gas pressure within the gas space.

With this arrangement, no closing spring is needed to control the gas-injection valve since the valve closing force is solely produced, when the operating space is deenergized, by the gas pressure that also keeps the poppet valve in its closed position. Hence, valve movement to the closed position is effected purely pneumatically. Since there is no spring force to be overcome, the gas-injection valve will open more rapidly which, in turn, enables it to control small gas quantities.

The piston and the poppet valve preferably are connected together in a manner avoiding guiding and sealing problems, which is facilitated also by the fact that the gas-pressure is the same all around the poppet valve.

The operating space within the gas-injection valve has associated therewith a pressure relief valve which is adapted to open when the pressure within the operating or hydraulic control space reaches a predetermined level, yet still to allow the poppet valve to be held in its open position while hydraulic control fluid is fed to the operating space by the pressure pump.

DESCRIPTION OF THE PREFERRED EMBODIMENTS

Figure 1:
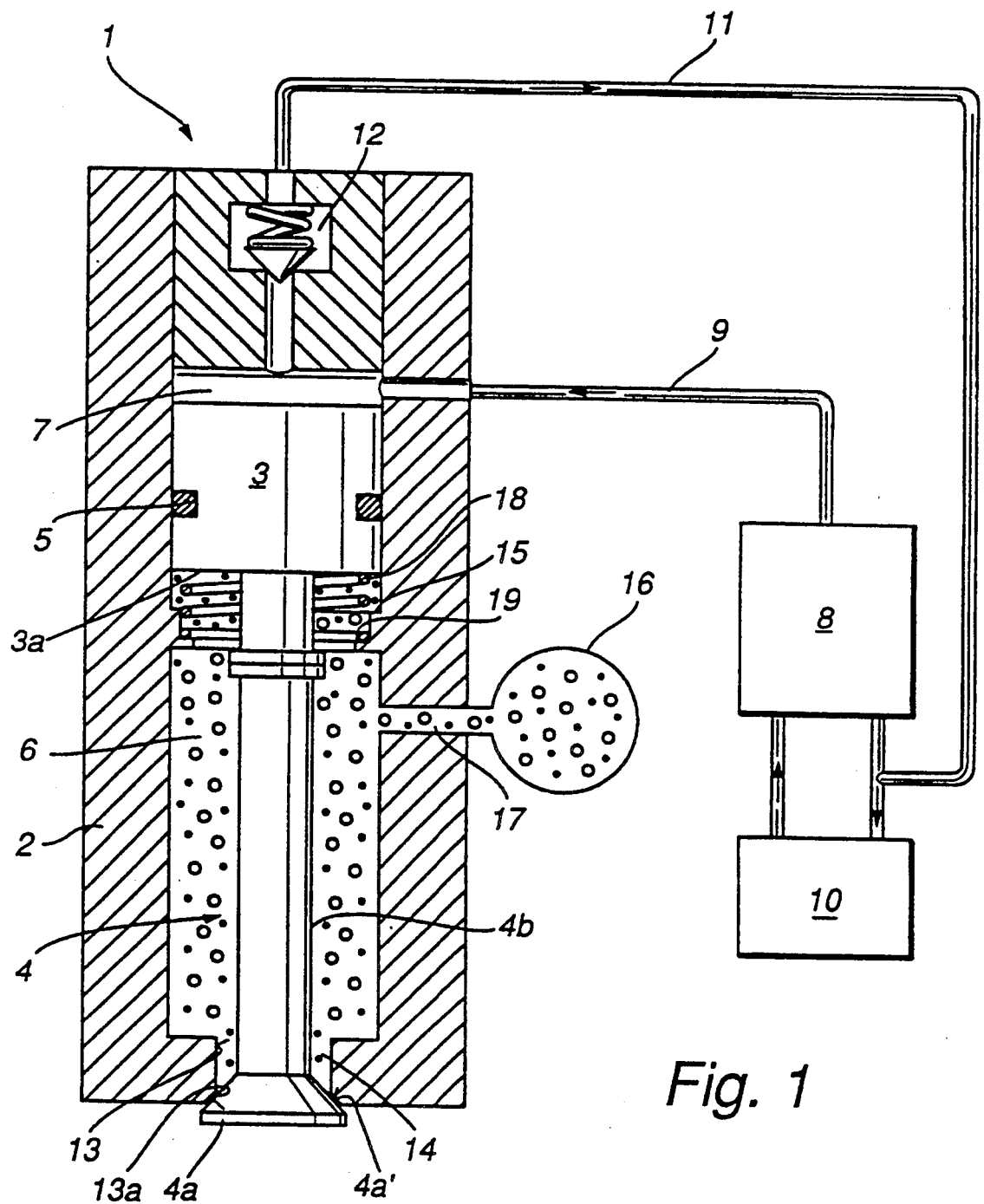
FIG. 1 is a sectional view of a gas-injection valve embodying the invention.

As shown in the drawings, the gas-injection valve 1 embodying the invention comprises a valve housing 2 and, disposed therein, a piston 3 guided so as to be longitudinally displaceable, and an outwardly opening poppet valve 4.

The piston 3 which is provided with a seal ring 5 separates a gas space 6 around the poppet valve 4 from an operating or hydraulic control space 7 adapted to be pressurized with hydraulic control fluid, such as, for example, diesel fuel, fed thereto by a pressure pump 8 through a delivery conduit 9.

The operating space 7 is connected to a hydraulic control-fluid tank 10 through a return conduit 11 connected in series with a pressure-relief valve 12 adapted to allow hydraulic control fluid being fed into the operating space 7 to flow off through the line 11 when the pressure within the operating space 7 reaches a predetermined level which may be set during the assembly. The pressure relief valve 12 may be either an integral part of the gas-injection valve 1, as shown, or may be arranged on the outside thereof.

The poppet valve 4 comprises a valve disc 4a which, in the closed position of the gas-injection valve 1, extends partially into a cylindrical injection port 13 formed through a wall portion of the valve housing 2, and a two-part valve stem 4b the two parts of which are connected together, in a region near the piston 3, in an articulated manner. This two-part design advantageously affects guidance and improves gas-tightness. The valve stem 4b defines an inner boundary and the inner wall of the valve housing 2 defines an outer boundary of the gas space 6, the latter thus being annular and extending from an annular end surface 3a of the piston 3 uninterruptedly to the valve disc 4a of the poppet valve 4.

The injection port 13 has a conical valve seat 13a formed therein adjacent the end thereof facing the combustion chamber, which valve seat is sealingly engaged, when the poppet valve is in its closed position, by a lower portion of the conical outer surface of the valve disc 4a.

The injection port 13 and the valve stem 4 define an annular gap 14 therebetween.

The annular end surface 3a of the piston 3 is substantially larger in diameter than the valve disc 4a of the poppet valve 4. The resulting difference in surface area determines the valve closing force, which means that, when the pressure of the hydraulic control fluid in the operating space 7 is low, the injection valve 1 is maintained in its closed position solely by means of the gas pressure existing in the gas space 6.

The valve housing 2 is provided with an inwardly projecting shoulder 15 which serves as a stop for terminating the movement of the piston 3 in the valve opening direction.

Reference numeral 16 designates a gas reservoir in which exists a constant gas pressure at between 20 and 200 bars, the magnitude at the constant injection pressure being in direct relation to the valve-closing duration needed. Gas tram the reservoir 16 is conducted into the annular gas space 6 through an opening 17 extending through a side wall portion of the valve housing 2.

A retainer spring 18 may be provided in the valve housing 2 to aid, when the gas-injection valve 1 is in its closed position, in holding the poppet valve 4 firmly and reliably in sealing engagement with the valve seat 13a at the injection port 13. This retainer spring 18 bears at one end thereof against the piston 3 and is seated at its opposite end on a spring support 19 located beneath the shoulder 15, i.e., spaced therefrom in the valve opening direction.

Figure 2:
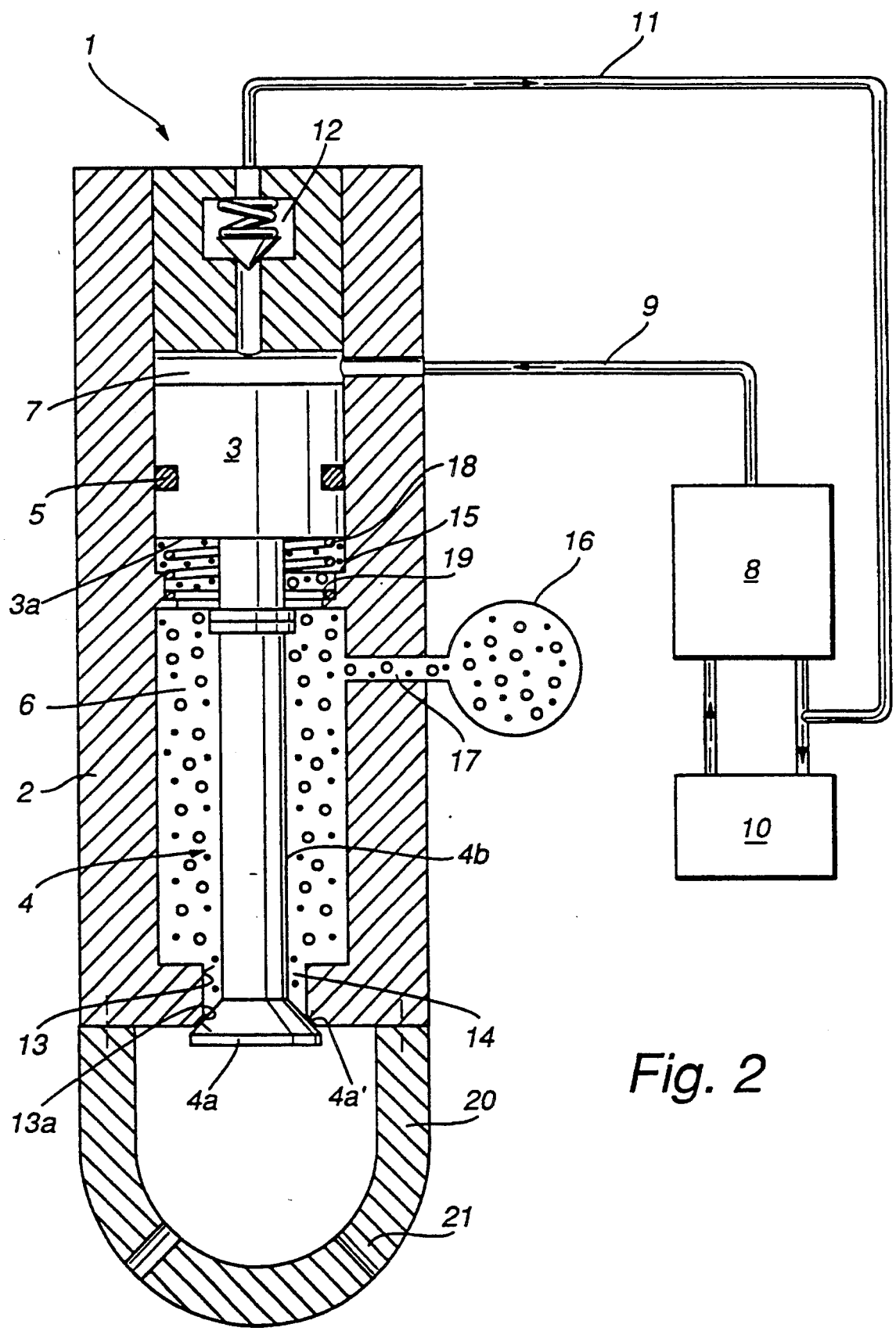
FIG. 2 is a similar view of the same gas-injection valve but modified to include a blow cap.

If desired, and as shown in FIG. 2 of the drawings, there may be provided a blow cap 20 having one or more blow parts 21 for optimizing the configuration of the gas jet being injected, the blow cap 20 being rigidly connected to the valve housing 2 and communicating with the injection port 13.

MODE OF OPERATION

In the drawings, the injection valve 1 is shown in its closed position in which only the gas, more particularly, hydrogen, pressure within the gas space 6 suffices as the valve closing force. As soon as the pressure pump 8 begins feeding hydraulic control fluid to the operating space 7, pressure builds up within the latter and, in overcoming the gas or hydrogen pressure within the gas space 6, displaces the piston 3 so as to effect movement of the poppet valve 4 to its open position in the direction of gas flow. This causes gas from the reservoir 16 to be injected into the combustion chamber through the annular gap 14 as fan-like spray.

In the event the bevel-controlled pressure pump 8 does not at this point terminate the feed of hydraulic control fluid to the operating space 7, the piston 3 will be kept seated against the stop 15 whilst the hydraulic control fluid, e.g., diesel fuel, continuing to be pumped is allowed by the pressure relief valve 12 to return to the tank 10 when the pressure within the operating space 7 reaches a predetermined level.

Upon termination of the delivery of hydraulic control fluid into the operating space 7, the pressure in the latter will collapse, thereby enabling the gas pressure within the gas space 6 to restore the injection valve 1 to its closed position. Hydraulic control fluid displaced by the piston 3 after reclosure of the pressure relief valve 12 will return to the pressure pump 8 through the feed line 9 and, thence, into the control-liquid tank 10.

What is claimed is:

1. A gas-injection control valve for injecting gaseous fuel, particularly hydrogen, into a combustion chamber of an internal combustion engine, comprising: a valve housing with a cylindrical cavity, a control piston movably disposed in said cylindrical cavity and defining an operating space at one side thereof and a gas space at the other side thereof, said housing having a gas injection port arranged at the end of said gas space opposite said control piston, a valve element disposed in said injection port for closing said injection port and forming a poppet valve adapted to open in the direction of gas flow from said gas space out through said injection port, said poppet valve having a valve stem extending through said gas space and operatively connected to said control piston, said control piston having a diameter larger than said poppet valve and said housing having a gas supply opening for supplying gas under pressure to said gas space whereby said gas under pressure holds said poppet valve in a closed position when the operating space at said one side of said control piston is not pressurized, and means for supplying a hydraulic control fluid under pressure to said operating space at said one side of said control piston for opening said poppet valve so as to permit the discharge of said gas from said gas space through said injection port.

2. A gas-injection valve according to claim 1, wherein said poppet valve comprises a valve disc seated on said injection port and said gas space is an annular space which surrounds said valve stem and extends from said piston completely to said valve disc.

3. A gas-injection valve according to claim 1, wherein said injection port includes a conical valve seat, said poppet valve including a conical disc having formed thereon near the downstream end of the poppet valve, a seating surface conformed to said conical valve seat.

4. A gas-injection valve according to claim 1, wherein valve stem is of two-part construction the two parts of which are connected together in an articulated manner.

5. A gas-injection valve according to claim 1, wherein said means for supplying a hydraulic control fluid to said operating space includes a control-liquid tank from which said hydraulic control fluid is drawn and said operating space has associated therewith a pressure relief valve for opening a fluid flow path from said operating space to said control-liquid tank when the injection valve is open and the pressure within said operating space reaches a predetermined level.

6. A gas-injection valve according to claim 1, including a blow cap having at least one blow port, said blow cap being affixed to said valve housing and communicating with said injection port.

* * * * *